(12) United States Patent
Aasberg-Petersen et al.

(10) Patent No.: US 7,241,401 B2
(45) Date of Patent: *Jul. 10, 2007

(54) PROCESS FOR THE PRODUCTION OF SYNTHESIS GAS (75) Inventors: Kim Aasberg-Petersen, Holte (DK); Ib Dybkjaer, Copenhagen (DK); Peter Seier Christensen, Copenhagen (DK); Thomas Rostrup-Nielsen, Holte (DK); Niels Erikstrup, Frederiksberg (DK); Jens-Henrik Bak Hansen, Frederiksberg (DK)

(73) Assignee: Haldor Topsoe A/S, Lyngby (DK)

( * ) Notice: Subject to any disclaimer, the term of this patent is extended or adjusted under 35 U.S.C. 154(b) by 779 days.

This patent is subject to a terminal disclaimer.

(21) Appl. No.: 10/667,389

(22) Filed: Sep. 23, 2003

(65) Prior Publication Data
US 2004/0063797 A1    Apr. 1, 2004

(30) Foreign Application Priority Data
Sep. 26, 2002    (DK) ............................... 2002 01435

(51) Int. Cl.
C07C 1/02    (2006.01)
C07C 27/00    (2006.01)

(52) U.S. Cl. ...................... 252/373; 518/702; 518/703; 518/704

(58) Field of Classification Search ................ 252/273, 252/373; 518/702, 703, 704
See application file for complete search history.

(56) References Cited

U.S. PATENT DOCUMENTS 4,400,309 A    8/1983    McMahon et al.
4,618,451 A    10/1986    Gent
4,788,004 A    11/1988    Pinto et al.
4,822,521 A    4/1989    Fuderer
4,830,834 A    5/1989    Stahl et al.
4,844,837 A    7/1989    Heck
4,927,857 A    5/1990    McShea et al.
5,004,592 A    4/1991    Pinto (Continued)

FOREIGN PATENT DOCUMENTS

DE    33 45 064    6/1985

(Continued)

OTHER PUBLICATIONS

J. R. Rostrup-Nielsen et al., "$CO_2$ Reforming of Methane Over Transition Metals", *Journal of Catalysis* 144, pp. 38-49 (1993).

(Continued)

*Primary Examiner*—J. Parsa
(74) *Attorney, Agent, or Firm*—Dickstein Shapiro LLP (57) ABSTRACT Process and system for the production of synthesis gas from a hydrocarbon feed stock comprising the steps of endothermic and/or adiabatic catalytic steam reforming and autothermal steam reforming in series, wherein the steam reforming is carried out in one or more endothermic stages in series or in one or more adiabatic steam reforming stages in series with intermediate heating of feed stock gas leaving the adiabatic reforming stages and wherein carbon monoxide containing gas characterised by having a molar ratio of hydrogen to carbon of less than 4.5 is added prior to at least one of the endothermic or adiabatic steam reforming stages and/or prior to the autothermal steam reforming step.

9 Claims, 2 Drawing Sheets

U.S. PATENT DOCUMENTS

| | | |
|---|---|---|
| 5,011,625 A | 4/1991 | Le Blanc |
| 5,030,661 A | 7/1991 | Lywood |
| 5,068,058 A | 11/1991 | Bushinsky et al. |
| 5,167,865 A | 12/1992 | Igarashi et al. |
| 5,429,809 A | 7/1995 | Stahl et al. |
| 5,486,313 A | 1/1996 | De Jong et al. |
| 5,567,397 A | 10/1996 | Le Gal et al. |
| 5,861,441 A | 1/1999 | Waycuilis |
| 5,932,141 A | 8/1999 | Rostrop-Nielsen et al. |
| 6,123,873 A | 9/2000 | Primdahl |
| 6,224,789 B1 | 5/2001 | Dybkjaer |
| 6,375,916 B2 | 4/2002 | Christensen et al. |
| 6,444,712 B1 | 9/2002 | Janda |
| 6,525,104 B2 | 2/2003 | Abbott |
| 6,726,851 B1 | 4/2004 | Thomsen |
| 6,730,285 B2 | 5/2004 | Aasberg-Petersen et al. |
| 6,746,624 B1 | 6/2004 | Christensen et al. |
| 6,749,829 B2 | 6/2004 | Briscoe |
| 6,773,691 B2 | 8/2004 | Ramani et al. |
| 6,818,198 B2 | 11/2004 | Singh et al. |
| 6,855,272 B2 | 2/2005 | Burlingame et al. |
| 6,908,571 B2 | 6/2005 | Primdahl et al. |
| 7,074,347 B2 * | 7/2006 | Erikstrup et al. ........... 252/373 |
| 2001/0051662 A1 | 12/2001 | Arcuri et al. |
| 2002/0006968 A1 | 1/2002 | Abbott |

FOREIGN PATENT DOCUMENTS

| | | |
|---|---|---|
| EP | 0 855 366 | 7/1998 |
| EP | 1 069 070 | 1/2001 |
| EP | 1 241 130 A | 9/2002 |
| JP | 48-084808 | 11/1973 |
| JP | 52-065190 | 5/1977 |
| JP | 53-082690 | 7/1978 |
| JP | 61-097105 | 5/1986 |
| JP | 62-216634 | 9/1987 |
| WO | WO 00/58242 A | 10/2000 |

OTHER PUBLICATIONS

T. S. Christensen, "Diabatic Prereforming of Hydrocarbons—An Important Step in Syngas Production", *Applied Catalysis A: General* 138, pp. 285-309 (1996).

* cited by examiner

PROCESS FOR THE PRODUCTION OF SYNTHESIS GAS

The invention concerns the production of synthesis gas by a sequence of one or more endothermic and/or adiabatic steam reforming and autothermal steam reforming.

BACKGROUND OF THE INVENTION

U.S. Pat. No. 6,375,916 discloses a method for preparing synthesis gas by installing a pre-reformer upstream an autothermal reformer (ATR). The pre-reformer is used to remove or reduce the contents of higher hydrocarbons from a hydrocarbon feed stream with the advantage that lower steam to carbon ratios can be employed without soot formation in the ATR. However, the process described is not able to produce a synthesis gas with an hydrogen-to carbon monoxide ratio close to 2.0 unless either the steam-to-carbon ratio is very low (probably less than 0.2) or the difference between the exit temperature from and the inlet temperature to the ATR is very high. In the former case this may give difficulties with operating the prereformer without carbon formation and in the latter case the amount of oxygen used may be disadvantageously high.

US Patent application 20010051662 by Arcuri et al. discloses a method to produce synthesis gas involving among others the mixing of tail gas and a hydrocarbon feedstock and feeding the resultant mixture to an adiabatic pre-reformer. The effluent from the adiabatic pre-reformer is passed to a synthesis gas generator for production of synthesis gas.

If the synthesis gas generator is an autothermal reformer, a synthesis gas with a hydrogen to carbon monoxide ratio of about 2.0 can be produced. However, recirculation of the tail gas to the feed to the adiabatic pre-reformer is disadvantageous because the risk of carbon formation will be higher in the prereformer. This means that the process must be operated at a higher steam-to-carbon ratio. Low steam-to-carbon ratios are generally preferable in Fischer-Tropsch to improve economics.

U.S. Pat. No. 6,525,104 describes a process in which a heat exchange reformer is placed in series with and upstream of an Autothermal Reformer for production of synthesis gas. Recirculated carbon dioxide is added to the feed stream to the heat exchange reformer. The amount of recirculated carbon dioxide is adjusted to between 20 and 60% of the carbon from hydrocarbons in the feed stream to the plant. No prereformer is used. The carbon dioxide is recovered and recirculated from one of several possible locations downstream the Autothermal Reformer.

This concept has several disadvantages for production of synthesis gas for Fischer-Tropsch processes. One disadvantage is that a costly step of separating carbon dioxide from a mixed gas stream is needed. Another disadvantage is that it may not be possible with the amount of recirculated carbon dioxide to produce a synthesis gas with the desired hydrogen-to-carbon monoxide ratio (i.e. a $H_2/CO$ ratio of approximately 2.00) except possibly at relatively high steam-to-carbon ratios. In the examples given in U.S. Pat. No. 6,525,104 a steam-to-carbon ratio of 1.5 is used. A steam-to-carbon ratio of 1.5 will in many cases render a process for production of Fischer-Tropsch products uneconomical.

In another embodiment disclosed in U.S. Pat. No. 6,525,104 a higher hydrocarbon (hydrocarbons with two or more carbon atoms) and carbon dioxide containing gas stream is recirculated to the feed to an adiabatic prereformer placed upstream and in series with the heat exchange reformer and the autothermal reformer. If this recirculated gas stream is a tail gas from a Fischer Tropsch synthesis section, then this process would have the disadvantage of an increased risk of carbon formation in the prereformer as described above. Hence, a higher steam-to-carbon ratio would be needed. This may appear surprising as it is generally accepted that passing higher hydrocarbon containing gas streams through an adiabatic prereformer is advantageous from a process economic point of view.

SUMMARY OF THE INVENTION

The invention is a process for the production of synthesis gas from a hydrocarbon feed stock comprising the steps of endothermic and/or adiabatic catalytic steam reforming and autothermal steam reforming in series, wherein the steam reforming is carried out in one or more endothermic stages in series and/or in one or more adiabatic steam reforming stages in series with intermediate heating of feed stock gas leaving the adiabatic reforming stages and wherein carbon monoxide containing gas characterised by having a molar ratio of hydrogen to carbon of less than 4.5 is added after at least one of the endothermic or adiabatic steam reforming stages and/or prior to the autothermal steam reforming step.

The invention also concerns a steam reforming system for use in the above synthesis gas production process.

A plant for production of synthetic diesel and other synthetic hydrocarbons consists of three main units. In the first main unit synthesis gas (a mixture of hydrogen and carbon oxides) is produced from the feedstock which is usually natural gas or a similar light hydrocarbon feedstock. In the second main unit, the actual hydrocarbon synthesis takes place usually by the Fischer-Tropsch synthesis. In the final unit often known as the Product Work-up unit the raw products are refined and/or separated to give the desired end products. The present invention relates to an improved method for production of synthesis gas.

Today one of the most cost effective and efficient methods for production of synthesis gas is by Autothermal Reforming (ATR). In ATR the light hydrocarbon feedstock with addition of steam reacts with a sub-stoichiometric amount of oxygen to produce synthesis gas. An ATR reactor consists of a burner, a combustion chamber, and a catalyst bed in a re-fractory lined pressure shell. The ATR reactor is a conventional process unit as described in the art.

For the Fischer-Tropsch synthesis to be as effective as possible, a specific synthesis gas composition is often desired. In many cases the desired synthesis gas composition is given by the ratio of the hydrogen content to the carbon monoxide content. The desired ratio is often approximately 2.0. With most operating conditions ATR is not able to produce this ratio from natural gas, which generally has a high atomic H/C ratio often close to 4.

In order to obtain the desired $H_2/CO$ ratio in the product gas, additional feedstock with a low atomic H/C ratio must be added to a location upstream the ATR reactor. This additional feedstock could be carbon dioxide (requiring that pure carbon dioxide is recovered from an impure gas stream) or a tail gas, which is essentially a byproduct from the Fischer-Tropsch synthesis unit and/or the Product Work-up unit. The main components in the tail gas are usually carbon monoxide, carbon dioxide, hydrogen, various light paraffinic and olefinic hydrocarbons and sometimes inert gases such as nitrogen and argon.

As described above, it is hardly possible to produce a synthesis gas with a composition of $H_2/CO$ of approximately 2 without recycle. This can be understood from the following simplified explanation.

The desired product has a ratio of atomic hydrogen to atomic carbon $(H/C)_{product}$ of approximately 4. The feed consisting of natural gas (or other light hydrocarbon component) and steam has a $(H/C)_{feed}$ ratio of typically 4.5–7.5 depending on the steam-to-carbon ratio and the hydrocarbon stream composition. As an example a mixture of 100 moles methane and 60 moles steam corresponding to a steam-to-carbon ratio of 0.60 will have an atomic (H/C) ratio of 5.20.

The $(H/C)_{product}$ is lower than $(H/C)_{feed}$ and hence addition of a (recycle) stream with an atomic (H/C) ratio less than $(H/C)_{product}$ is needed. The desired $H_2/CO$ ratio in the product gas may often be between 1.7 and 2.3 corresponding to $(H/C)_{product}$ equal to 3.4–4.6.

It is recognized that the above is a simplified representation (e.g. since some of the carbon in the feed will remain in methane or be converted into carbon dioxide).

However, for practical applications this explanation is suitable and the ratio of atomic hydrogen to atomic carbon in the recycle gas must be equal to or below 4.5 $((H/C)_{recycle} \leq 4.5)$ Synthesis gas production may account for more than 50% of the total capital cost in a Fischer-Tropsch plant. For a plant based on ATR a large fraction of the cost of the synthesis gas production unit (e.g. 40–60%, depending upon the scale and specific site and technology) arises from the air separation unit needed to produce oxygen. Hence, there is a considerable interest in methods for reducing the oxygen consumption per unit of synthesis gas produced.

Increasing the temperature of the hydrocarbon feedstock before it enters the ATR reactor and/or reducing the steam-to-carbon (S/C) ratio reduces the oxygen consumption. The S/C-ratio is defined as the ratio of the amount of steam to carbon from hydrocarbons in the hydrocarbon feedstock. Both of the described methods have disadvantages. Increasing the feedstock temperature increases the risk of cracking of the hydrocarbons in the feedstock and means that more expensive materials must be used in the heaters or heat exchangers upstream the ATR. Reducing the S/C-ratio decreases the margin to soot formation in the ATR and may also increase the risk of cracking of hydrocarbons in heaters or heat exchangers upstream the ATR. The present invention concerns a process, whereby both of these disadvantages are avoided while the oxygen consumption is reduced considerably.

According to the present invention a reformer unit is placed before and in series with the ATR reactor. The reformer unit receives heat from a hot process gas stream and steam reforming of hydrocarbons takes place in the reformer unit as illustrated below for methane:

$$CH_4 + H_2O \Leftrightarrow 3H_2 + CO \quad (1)$$

The steam reforming reaction is accompanied by the Shift Reaction:

$$CO + H_2O \Leftrightarrow H_2 + CO_2 \quad (2)$$

The above two reactions are in most cases close to equilibrium at the reformer unit outlet. If higher hydrocarbons (hydrocarbons with 2 or more hydrocarbon atoms) are present in the reformer unit feed stream, these are also steam reformed according to reactions similar to the above. It is described in the art (e.g. U.S. Pat. No. 6,375,916) that a pre-reformer can be placed upstream the ATR in a Fischer-Tropsch plant. In this case, the reformer unit is placed between the pre-reformer and the ATR, i.e. in series and downstream the pre-reformer and in series and upstream the ATR.

In the process of the invention, the carbon monoxide containing gas is exemplified by use of a tail gas. Tail gas is added to the reformer unit effluent and/or to the feed stream to the reformer unit (after the prereformer if such is present). Tail gas may also be added between individual stages of the reformer unit as described below.

Addition of a reformer unit upstream the ATR provides a means for adding heat into the ATR feed stream, while maintaining a reasonable temperature at the ATR reactor inlet. At the same time a sufficient margin to the soot points for the ATR are maintained and the risk of cracking from hydrocarbons in the ATR feed stream is reduced. Furthermore, by addition of at least part of the tail gas to the reformer unit effluent, the risk of carbon formation in the prereformer and the reformer unit can be controlled allowing operation at a low steam-to-carbon ratio. Furthermore, the oxygen consumption per unit of produced synthesis gas is decreased compared to prior art without substantially affecting the synthesis gas composition.

DETAILED DESCRIPTION OF THE INVENTION

Figure 1:
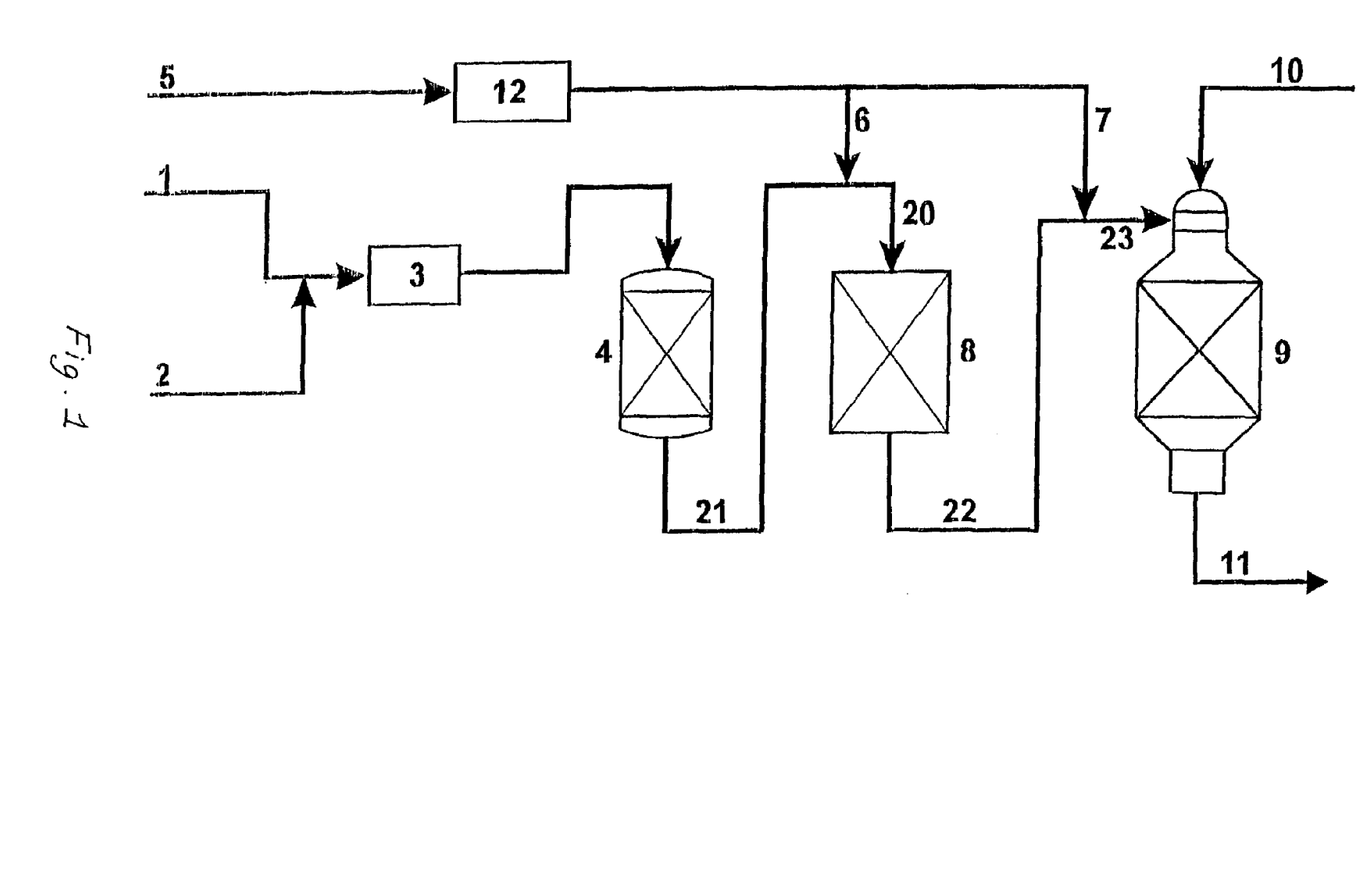
FIG. 1 shows the overall process scheme with the reformer unit.

A description of the process scheme with the reformer unit is given in FIG. 1. Desulphurised natural gas (1) or a similar feedstock is mixed with steam (2) and preheated in the heat exchanger or heater (3) to the desired inlet temperature to the adiabatic pre-reformer (4). This temperature is typically between 320–550° C. In the pre-reformer (4) the following reactions take place:

$$CO + H_2O \Leftrightarrow H_2 + CO_2 \quad (2)$$

$$C_nH_m + nH_2O \Rightarrow nCO + \tfrac{1}{2}(m+2n)H_2 \, (>=2) \quad (3)$$

$$3H_2 + CO \Leftrightarrow CH_4 + H_2O \quad (4)$$

At most conditions higher hydrocarbons (hydrocarbons with more than 1 carbon atom) are completely removed. The last two reactions (4) and (2) are close to equilibrium at the exit temperature of the adiabatic pre-reformer (4). Typically, the catalyst in the adiabatic pre-reformer is nickel on a ceramic carrier.

Depending on the actual design of the desulphurisation unit, a small leakage of sulphur to the prereformer may occur. With most prereformer catalysts this minute amount of sulphur will be adsorbed.

Tail gas (5) heated in heater or heat exchanger (12) may optionally be added through line (6) to the pre-reformer effluent (21) to form the reformer unit feed stream (20). In the reformer unit (8) the reformer unit feed stream (20) is steam reformed according to the following reactions:

$$CH_4 + H_2O \Leftrightarrow 3H_2 + CO \quad (1)$$

$$CO + H_2O \Leftrightarrow H_2 + CO_2 \quad (2)$$

$$C_nH_m + nH_2O \Rightarrow nCO + \tfrac{1}{2}(m+2n)H_2 \quad (3)$$

At most conditions the reformer unit effluent (22) will be virtually free of higher hydrocarbons and reactions (1) and (2) above will be close to thermodynamic equilibrium. Most preferably, the reformer unit effluent (22) will have a temperature between 500° C. and 750° C. The heat for the endothermic steam reforming reactions and for the heating is supplied by heat exchange with a hot process gas stream (not shown in FIG. 1).

Heated tail gas is added to the reformer unit effluent through line (7) resulting in an ATR feed stream (23). The ATR feed stream (23) and oxidant (10) usually containing more than 90% oxygen is passed to the autothermal reformer (9) in which synthesis gas is produced and withdrawn as product (11), which is sent to the Fischer-Tropsch synthesis section. The produced synthesis gas withdrawn from the autothermal reformer may (before being sent to the Fischer-Tropsch section) be used as heat source in a heat exchange reformer. The total amount of tail gas added through line (6)(optional) and (7) is adjusted to give the desired exit gas composition from the autothermal reformer (9).

Steam reforming involves the risk of detrimental carbon formation on the catalyst. Carbon may deposit on the catalyst either from methane, carbon monoxide, higher paraffinic hydrocarbons or other components such as olefins.

For methane the carbon forming reaction may be expressed by:

$$CH_4 \Leftrightarrow C + 2H_2 \tag{5}$$

The risk of carbon formation from methane may often be evaluated by thermodynamics. This is often done as follows:

The composition assuming chemical equilibrium of the steam reforming and shift reactions (1–3) is calculated based on the feed stream composition and the temperature and pressure. This should in principle be done at each position in the reactor. However, experience shows that the risk of carbon formation from methane according to reaction (5) increases with temperature. Based on the calculated equilibrium composition, the reaction quotient for reaction (5) is calculated. The reaction quotient $Q_c$ is the ratio of the square of the partial pressure of hydrogen to the partial pressure of methane ($P^2_{H2}/P_{CH4}$). If the ratio is higher than the equilibrium constant for reaction (5) at the same temperature, carbon is not predicted to form. A similar approach for carbon formation from carbon monoxide on a catalyst may be used by addressing the reaction:

$$2CO \Leftrightarrow C + CO_2 \tag{6}$$

The formation of carbon on a catalyst from higher hydrocarbons in the form of paraffins can be expressed by:

$$C_nH_m \Rightarrow nC + \tfrac{1}{2}mH_2 (n=2,3,4, \ldots \text{ and } m=2+2n) \tag{7}$$

At a given temperature it is stated in the art that the risk of carbon formation on the catalyst is reduced by increasing the ratio of steam to higher hydrocarbons in the feed gas.

Finally, carbon formation on a reforming catalyst may occur from olefins or other unsaturated hydrocarbons. It is generally important to minimise the amount of unsaturated compounds in a gas in contact with a reformer catalyst as the rate of carbon formation may be very high as known in the art.

The catalyst in the reformer unit may be either nickel-based catalysts and/or catalysts based on noble metals. With noble metals it is possible to operate with lower steam-to-carbon ratios without detrimental carbon formation on the catalyst as described in the art, e.g. Rostrup-Nielsen et al., J. of Catalysis 144, pages 38–49,1993, incorporated herein by reference. Often, the required amount of steam to avoid carbon formation increases with increasing temperature.

Hence, in one embodiment of the present invention nickel can be used at the zones in the reformer unit operating at lower temperature, while noble metals can be used in the zones operating at higher temperatures.

The hydrogen content in the gas leaving the reforming unit is higher than the content in the reformer unit feed gas. If tail gas is added partially or completely downstream the reformer unit, then the ratio of hydrogen to higher hydrocarbons in the ATR feed stream is higher than when the reformer unit is not present. Higher hydrocarbons may react thermally crack) into carbonaceous species such as aromatics, polyaromatics and carbon at elevated temperatures. This can be represented by the following reaction:

$$C_nH_m \Rightarrow nC + \tfrac{1}{2}mH_2 \tag{7}$$

Since a large amount of hydrogen is present in the process of the invention, the risk of thermal cracking is reduced and/or the tail gas may be preheated to a higher temperature increasing the syngas production per unit of oxygen consumed.

The removal of (part of) the higher hydrocarbons in the tail gas by reaction in the reformer unit is by itself beneficial in terms of increasing the margin to soot formation in the ATR.

The optimal design of the reformer unit and the distribution of tail gas depends on a number of factors including natural gas composition, temperature, pressure and tail gas composition.

The catalytic activity for steam reforming in the reformer unit can be obtained either by conventional fixed beds of (pellet) catalysts, by catalysed hardware, or by structured catalysts. In case of catalysed hardware, catalytic material is added directly to a metal surface. The catalytic coating of a metal surface (wash coating) is a well known process (a description is given in e.g. Cybulski, A., and Moulijn, J. A., Structured catalysts and reactors, Marcel Dekker, Inc, New York, 1998, Chapter 3, and references herein).

The appropriate material, preferable a ferritic steel containing Cr and/or Al, is heated to a temperature preferably above 800° C. in order to form a layer of Cr and/or Al oxide. This layer facilitates a good adhesion of the ceramic to the steel. A thin layer of a slurry containing the ceramic precursor is applied on the surface by means of e.g. spraying, painting or dipping. After applying the coat the slurry is dried and calcined at a temperature usually in the region 350–1000 C. Finally, the ceramic layer is impregnated with the catalytic active material.

Alternatively the catalytic active material is applied simultaneously with the ceramic precursor.

Catalysed hardware can in the present invention either be catalyst attached directly to a channel wall in which the process gas flows or catalyst attached to a metallic structured element forming a structured catalyst. The structured element serves to provide support to the catalyst.

Further catalyst hardware is in form of catalyst being deposited in metallic or ceramic structure, which is adhered to wall of the reactor.

Structured elements are devices comprising a plurality of layers with flow channels present between the adjoining layers. The layers are shaped in such a way that placing the adjoining layers together results in an element in which the flow channels can, for instance, cross each other or can form straight channels. Structured elements are further described in for instance U.S. Pat. Nos. 5,536,699, 4,985,230, EP patent application Nos. 396,650, 433,223 and 208,929, all of which are incorporated herein by reference.

Two types of structured elements are particularly suitable for the inventive process—the straight-channelled elements and the cross-corrugated elements.

The straight-channelled elements require adiabatic conditions and various geometries of these elements are possible. For example, straight channel monoliths are suitable for use in the process of the invention in the adiabatic reactor(s).

Cross-corrugated elements allow efficient heat transfer from the reactor wall to the gas stream. They are also suitable for use in the process of the invention especially in the sections with heat exchange.

Other catalysed structured elements can also be applied in the process of the invention such as high surface structured elements.

Examples of structured catalysts includes catalysed monoliths, catalysed cross-corrugated structures and catalysed rings (e.g pall-rings).

Both with catalysed hardware applied directly to the wall of the reactor and with structured catalysts, the amount of catalyst can be tailored to the required catalytic activity for the steam reforming reactions at the given operating conditions. In this manner the pressure drop is lower and the amount of catalyst is not more than needed which is especially an advantage if the costly noble metals are used.

In more conventional applications with pellets, the steam reforming reactors are often designed to maximise heat transfer and pellets are simply placed in channels where the process gas flows often resulting in a vast excess of catalytic activity.

In yet another aspect of the present invention, the flow through the catalyst may be upflow when catalyst hardware or structured catalysts are used. This can hardly be done in the case of pellets due to the risk of fluidisation. One advantage of this specific embodiment is that substantial degree of piping may be avoided reducing plant cost.

Another possibility is that the tube diameter can be reduced by use of catalysed hardware. It is generally recognised that the ratio of the tube diameter to the diameter of catalyst pellets should be above 4–5. To avoid excess pressure drops this minimises the acceptable diameter of the tube (or other channel geometry). With a structured catalyst or with catalysed hardware this constraint is eliminated opening the possibility for more compact reformers.

Similar advantages can be obtained if the structured catalyst is in the form of ceramic monoliths or ceramic cross-corrugated structures with active catalyst material.

Figure 2:
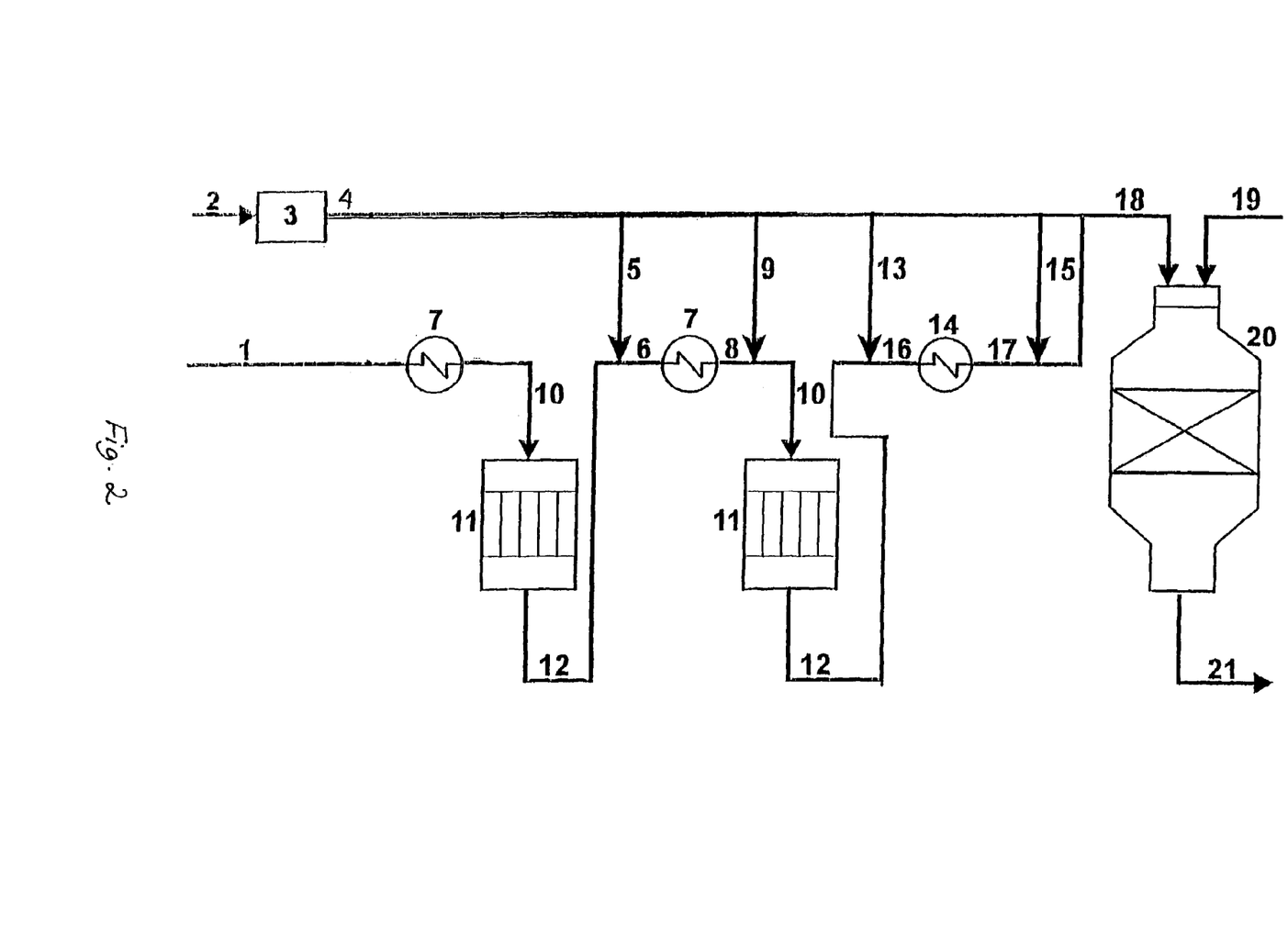
FIG. 2 shows a specific embodiment of the process.

Reference is made to FIG. 2 in which a specific embodiment of the invention is illustrated. The tail gas (2) is pre-heated by heater or heat exchanger (3) giving a heated tail gas stream(4).

A hydrocarbon containing feedstock (1) is treated in a number of sequential steps comprising the following (two sequential steps are shown in FIG. 2):

Optional addition of tail gas (5) resulting in heat exchanger feed stream (6)

Heating heat exchanger feed stream (6) resulting in stream (8) and optionally adding to stream (8) an amount of tail gas (9) to form reactor feed stream (10).

Passing the reactor feed stream (10) into an adiabatic steam reforming reactor (11) in which the following reactions occur:

$$CH_4 + H_2O \Leftrightarrow 3H_2 + CO \quad (1)$$

$$CO + H_2O \Leftrightarrow H_2 + CO_2 \quad (2)$$

$$C_nH_m + nH_2O \Rightarrow nCO + \tfrac{1}{2}(m+2n)H_2 \quad (3)$$

These steps are continued until the desired temperature and exit gas composition is obtained. The effluent (12) from the last of the reactors can optionally be mixed with tail gas (13) to form the combined stream (16). This stream may be further heated in heater or heat exchanger (14) giving stream (17). Tail gas may optionally be added to this stream to form the ATR feed stream (18). The ATR feed stream (18) and oxidant (19) is fed to the ATR (20) in which synthesis gas is produced and withdrawn as product stream (21).

Another alternative is to use one or more adiabatic reactors in series as described above upstream one heated reactor (heat exchange reformer).

The hydrocarbon containing feed stream may be pre-reformed in an adiabatic pre-reformer prior to steps 1–3) above. The heat source for the heat exchangers is one or more hot gas streams not shown in FIG. 2. An example of such a hot process stream is the effluent stream from the ATR reactor.

This concept has a number of advantages in addition to those described earlier:

Complete decoupling of the reactor design and heat exchanger (or heater design)

Easier change of catalyst

Higher hydrogen to olefin ratio and higher steam to higher hydrocarbon ratio at the inlet to the adiabatic reactors if the tail gas is injected at several locations (unless all tail gas is injected downstream the reformer unit). This means that the risk of forming detrimental carbon on the catalyst is reduced Tailoring catalysts to the different operating conditions in the adiabatic reactors. One example is to use Nickel based catalysts in the first reactors(s) where the temperature is lowest and use noble metals in subsequent reactors. Often the amount of steam needed to avoid carbon formation increases with temperature. Since noble metals are more resistant to carbon formation than Nickel, these should be used at the higher temperatures.

The heat source for the reformer unit may be either from a fired heater or a hot process gas from elsewhere in the plant including the effluent from the ATR. The former alternative may have the disadvantage that additional natural gas or another hydrocarbon feedstock may have to be burned to provide the necessary heat. Part of this heat may be recovered by preheating the tail gas and/or the feed for the adiabatic pre-reformer by using the effluent from the ATR.

In case the effluent from the ATR is used as heat source, a risk of metal dusting corrosion exists. This can be prevented by adding a small amount (0.02–20 ppm v/v)of sulphur or sulphur containing compounds to the effluent from the ATR (or to the ATR feed stream). Alternatively, materials with high resistance to metal dusting can be employed in the reformer unit at least on the ATR effluent side. Examples include Inconel 693 or other materials with high resistance to metal dusting including coatings.

The use of highly metal dusting resistant materials may also be combined with addition of sulphur as described above.

EXAMPLES

Example 1

Natural gas with a composition of 95% methane, 3.5% ethane, and 1.5% propane is used. In all cases the amount of natural gas feed has been maintained at 1000 Nm$^3$/hr. A small flow of hydrogen of 20 Nm$^3$/hr is added to the natural gas in all cases. The steam to carbon (S/C) ratio is defined as the molar ratio of steam to carbon derived from hydrocarbons in the natural gas (i.e excluding carbon in tail gas). The tail gas used in all examples has one of the two compositions given in Table 1. Tail gas #2 is lean in carbon monoxide content.

TABLE 1

| Compound | Tail Gas #1 Concentration (mole %) | Tail Gas #2 Concentration (mole %) |
| --- | --- | --- |
| Hydrogen | 31.1 | 31.1 |
| Carbon Monoxide | 27.8 | 4.0 |
| Methane | 3.7 | 3.7 |
| Nitrogen | 4.0 | 4.0 |
| Carbon Dioxide | 30.4 | 53.2 |
| Ethane | 1.5 | 1.5 |
| Ethylene | 1.5 | 1.5 |
| Propane | 0.0 | 1.0 |
| Propylene | 0.0 | 1.0 |

Example 1A

Comparative Example

In this case desulphurised natural gas is mixed with steam and tail gas #1. The resultant mixture is heated to 430° C. and fed to an adiabatic pre-reformer. The pre-reformed mixture is heated to 600° C. The resultant mixture is fed to the Autothermal Reformer together with an oxidant (oxidant composition: 99.5% oxygen and 0.5% Argon) in which the synthesis gas is produced. The feed temperature of the oxygen is 200° C. The amount of tail gas added is adjusted to give a hydrogen-to-carbon monoxide ratio in the synthesis gas stream equal to 2.00. The ATR effluent temperature is 1050° C. All reactions are assumed to be in equilibrium at reactor outlet conditions. The pressure throughout the system is 2.48 MPa. The tail gas temperature is 200° C. The steam-to-carbon ratio is 0.6.

Example 1B

Comparative Example

In this case a heat exchange reformer has been placed between the prereformer and the autothermal reformer. Tail gas #1 is added upstream the prereformer. The amount of tail gas is adjusted such that the ratio of carbon dioxide to carbon from hydrocarbons in the natural gas is 20%. This corresponds to one embodiment disclosed in U.S. Pat. No. 6,525,104. The exit temperature from the heat exchange reformer is 600° C. The pressure, the pressure drop, the inlet temperature to the adiabatic prereformer, the oxygen temperature at the ATR inlet and the exit temperature from the Autothermal Reformer are as in example 1A. The steam-to-carbon ratio is 0.6 as defined in example 1A.

Example 1C

Comparative Example

Example 1C is identical to 1B except that pure carbon dioxide is added instead of tail gas. In addition, the carbon dioxide is added downstream the prereformer and upstream the heat exchange reformer at a temperature of 200° C.

Example 1D

Process of the invention with one odiabatic step

This is similar to example 1A except that the tail gas (#1) is added downstream the adiabatic prereformer and after the heating of the prereformer effluent to 600° C. The tail gas temperature is 200° C.

Example 1E

Process of the invention with one adiabatic step and one endothermic step

This example is similar to example 1D except that a reformer unit has been added downstream the adiabatic reformer. This corresponds to one adiabatic step and one endothermic step. Tail gas #1 with a temperature of 200° C. is added to the effluent from the reformer unit.

Example 1F

Process of the invention with one adiabatic step and one endothermic step

This example is identical to example 1E with the exception that 50% of the tail gas is added to the effluent from the reformer unit and the remaining 50% is added downstream the adiabatic reformer.

In Table 2 the production of synthesis gas (hydrogen and carbon monoxide) for examples 1A-1F is given relative to the natural gas and oxygen consumption. The hydrogen-to-carbon monoxide ratio in the synthesis gas is also given and tail gas #1 was used.

TABLE 2

| Example | Synthesis gas production (Nm3 syngas produced/Nm3 oxygen consumed) | Synthesis gas production (Nm3 syngas produced/Nm3 natural gas consumed) | Hydrogen-to-carbon monoxide ratio in synthesis gas ($H_2$/CO, mole/mole) |
| --- | --- | --- | --- |
| 1A | 5.03 | 3.14 | 2.00 |
| 1B | 5.17 | 3.44 | 1.72 |
| 1C | 5.23 | 2.99 | 1.86 |
| 1D | 5.11 | 3.16 | 2.00 |
| 1E | 5.49 | 3.22 | 2.00 |
| 1F | 5.39 | 3.21 | 2.00 |

In Table 3 below, the given inlet and outlet temperatures for examples 1A, 1B, 1D, and 1E of the adiabatic prereformer are given. The calculated reaction quotients at chemical equilibrium for the carbon formation reaction (5) from methane is also given at the inlet and outlet temperatures.

The equilibrium constant for reaction (5) at the inlet and outlet temperatures are also given assuming that carbon is in the form of graphite. It is recognised that the true equilibrium constant for carbon formation on a catalyst is different and to some extent depending upon the catalyst. However, for comparative and illustrative purposes, the use of the equilibrium constant for graphite is adequate.

In Table 3, the ratio of steam to moles of carbon from higher hydrocarbons (in the examples these are ethane, ethylene and propane) and the ratio of steam to ethylene in the prereformer inlet gas are also given.

TABLE 3

| Case | $T_{inlet}$ (° C.) | $T_{exit}$ (° C.) | $Q_{c,\,in}$ (atm · a) | $Q_{c,\,out}$ (atm · a) | $K_{p,\,in}$ (atm · a) | $K_{p,\,out}$ (atm · a) | S/HHC | S/C$_2$H$_4$ |
|---|---|---|---|---|---|---|---|---|
| 1A | 430 | 493 | 0.074 | 0.25 | 0.122 | 0.41 | 4.83 | 149 |
| 1B | 430 | 560 | 0.049 | 0.52 | 0.122 | 1.23 | 4.07 | 61 |
| 1C | 430 | 410 | 0.155 | 0.11 | 0.122 | 0.079 | 5.56 | Inf |
| 1D | 430 | 410 | 0.155 | 0.11 | 0.122 | 0.079 | 5.56 | Inf |
| 1E | 430 | 410 | 0.155 | 0.11 | 0.122 | 0.079 | 5.56 | Inf |
| 1F | 430 | 410 | 0.155 | 0.11 | 0.122 | 0.079 | 5.56 | Inf |

Inf = infinite (no ethylene present in natural gas)

The definitions are as follows:

T: Inlet temperature to and exit temperature from adiabatic prereformer $Q_c$: Reaction quotient ($P^2_{H2}/P_{CH4}$) for reaction (5) at prereformer inlet and outlet temperature (and pressure) after establishment of equilibrium of steam reforming and shift reactions.

$K_p$: Equilibrium constant for reaction (5) at inlet and outlet temperature of prereformer.

S/HHC: Ratio of steam to carbon from higher hydrocarbons at prereformer inlet.

S/C$_2$H$_4$: Ratio of steam to ethylene at prereformer inlet.

It is seen from Tables 2 and 3 that the present invention (1D, 1E, and 1F) provides considerable improvement.

Using the processes described is 1E and 1F a considerable increase in the syngas productivity per unit of oxygen is found. In addition, the syngas production per unit of natural gas feed consumption is improved with the exception of comparative example 1B. However, with 1B, it is not possible to produce a syngas with the desired composition of H$_2$/CO=2.00. In addition, in example 1B considerable recirculation is needed requiring a large recirculation compressor.

Example 1C provides a reasonable syngas productivity per unit of oxygen consumed. However, this concept suffers from the fact that a CO$_2$-separation step is needed and the synthesis gas productivity per unit of natural gas feed consumed is low.

A comparison of 1A and 1D shows a small improvement in terms of synthesis gas productivity by recirculating the tail gas to a position downstream the prereformer.

In Table 3, the advantages of the present invention are further illustrated. In the comparative examples 1A and 1B, the reaction quotients $Q_c$ are lower than the equilibrium constants, $K_p$, both at the inlet and the outlet of the prereformer. The opposite is the case in examples 1D, 1E and 1F of the present invention. This means that the present invention can be operated at a lower steam-to-carbon ratio (or with a larger margin to carbon formation) than the comparative examples 1A and 1B without risk of carbon formation in the prereformer (for a given catalyst).

It is also noted that the ratio of steam to carbon from higher hydrocarbons in the feed stream to the prereformer is higher according to the concepts described in the present invention. This may also be interpreted as reduced risk of carbon formation and/or a higher margin to the carbon formation limits for a given catalyst.

Finally, there are no olefins in the feed to the prereformer. Even very small amounts of olefins in the feed gas may cause rapid formation of carbon on a given catalyst. Hence, this is also a pronounced advantage of the present invention.

Example 2

This example is similar to example 1. In all the following sub-examples tail gas #1 is used.

Example 2A is a comparative example identical to Example 1A except that the preformed mixture is heated to 700° C. Example 2D is identical to Example 1D with the exception that the preformed mixture is heated to 700° C. before mixing with tail gas. Examples 2E and 2F are identical to 1E and 1F except that the exit temperature from the reforming unit is 700° C. In all of these cases the H$_2$/CO-ratio has been adjusted to 2.00 by the amount of tail gas recycled.

In Tables 4 and 5 the results for Examples 2A, 2B, 2E and 2F are given. It is observed that the advantage of the ability to operate with a lower content of steam in the feed gas is maintained also in this case. The second advantage in terms of higher syngas productivity is also evident irrespective of whether the tail gas is added downstream the reforming unit or split equally between upstream and downstream the reforming unit.

TABLE 4

| Example | Synthesis gas production (Nm3 syngas produced/ Nm3 oxygen consumed) | Synthesis gas production (Nm3 syngas produced/ Nm3 natural gas consumed) |
|---|---|---|
| 2A | 5.29 | 3.19 |
| 2D | 5.35 | 3.20 |
| 2E | 6.35 | 3.35 |
| 2F | 6.31 | 3.34 |

TABLE 5

| Case | $T_{inlet}$ (° C.) | $T_{exit}$ (° C.) | $Q_{c,\,in}$ (atm · a) | $Q_{c,\,out}$ (atm · a) | $K_{p,\,in}$ (atm · a) | $K_{p,\,out}$ (atm · a) | S/HHC | S/C$_2$H$_4$ |
|---|---|---|---|---|---|---|---|---|
| 2A | 430 | 496 | 0.073 | 0.26 | 0.122 | 0.43 | 4.80 | 141 |
| 2D | 430 | 410 | 0.155 | 0.11 | 0.122 | 0.079 | 5.56 | Inf |

TABLE 5-continued

| Case | $T_{inlet}$ (° C.) | $T_{exit}$ (° C.) | $Q_{c, in}$ (atm · a) | $Q_{c, out}$ (atm · a) | $K_{p, in}$ (atm · a) | $K_{p, out}$ (atm · a) | S/HHC | $S/C_2H_4$ |
|---|---|---|---|---|---|---|---|---|
| 2E | 430 | 410 | 0.155 | 0.11 | 0.122 | 0.079 | 5.56 | Inf |
| 2F | 430 | 410 | 0.155 | 0.11 | 0.122 | 0.079 | 5.56 | Inf |

Inf = infinite (no ethylene present in natural gas)

Example 3

Example 3 is identical to Example 2E except that the steam-to-carbon ratio has been varied. The results are given in Table 6. Tail gas #1 is used in all cases.

The prereformed mixture is steam reformed in a heat exchange reforming reactor where the required heat is supplied by heat exchange with the effluent stream from the ATR.

Tables 6a and 6b show the results obtained at various steam-to-carbon ratios.

Definitions:
Reformer Unit Duty: Heat input (per Nm3 natural gas feed) required to reach the exit conditions from the reformer unit (T=700° C. and chemical equilibrium of methane steam reforming and shift reactions).
Dry mole %: 100×(moles of $H_2$+CO in syngas)/(moles of syngas-moles of steam in syngas).
Recycle tail gas: Amount of tail gas recycle required to obtain the desired ratio of $H_2$/CO in the ATR effluent gas ($H_2$/CO=2.00).
Heat Exchange Reformer effluent Temperature (° C.): Temperature of ATR effluent gas after cooling by heat exchange in heat exchange reformer.

TABLE 6a

| Steam-to-carbon ratio | Synthesis gas production (Nm3 syngas produced/Nm3 oxygen consumed) | Synthesis gas production (Nm3 syngas produced/Nm3 natural gas consumed) | Heat Exchange Reformer Duty (Kcal/Nm³ NG) |
|---|---|---|---|
| 0.60 | 6.35 | 3.35 | 659 |
| 0.40 | 6.20 | 3.18 | 558 |
| 1.00 | 6.56 | 3.61 | 838 |

TABLE 6b

| Steam-to-carbon ratio | Dry % $H_2$ + CO in syngas | Recycle tail-gas ($Nm^3/Nm^3$ NG) | Heat Exchange Reformer effluent Temperature (° C.) |
|---|---|---|---|
| 0.60 | 94.2 | 0.355 | 616 |
| 0.40 | 95.0 | 0.222 | 639 |
| 1.00 | 92.1 | 0.618 | 595 |

It may appear attractive to increase the steam-to-carbon ratio strictly from a syngas productivity prospective (assuming enough tail gas is available). However, the advantage of a smaller content of inerts in the synthesis gas, smaller required duty (and thereby heat transmission surface), a smaller tail gas recycle (compressor) and generally smaller flows will usually be more important, thus favouring a smaller steam-to-carbon ratio. It can also be noted that with low steam-to-carbon ratio, the effluent temperature from the heat exchange reformer (heat supplying side) is highest indicating a moderately higher driving force for the heat transfer. The best choice will depend on site and project specific issues.

Example 4

Examples 4A, 4D, 4E, and 4F are identical to Examples 2A, 2D, 2E and 2F except that tail gas #2 is used. Example 4G is similar to 4F except that 75% of the tail gas is added upstream the reformer unit and 25% downstream.

With tail gas #2, which is lean in CO content, it seems at the given conditions that a marginal advantage exists by adding at least part of the tail gas upstream the reforming unit (downstream the prereformer). Table 7 shows the production of synthesis gas (hydrogen+carbon monoxide) relative to the natural gas and oxygen consumption for Example 4.

From Table 8, it can be seen that the present invention offers the advantage of ability to operate either with a larger margin to carbon formation or at lower steam-to-carbon ratio with a given catalyst. The $S/C_{olefin}$ ratio is the ratio of steam to olefins (sum of ethylene and propylene) in the feed to the adiabatic prereformer.

TABLE 7

| Example | Synthesis gas production (Nm3 syngas produced/Nm3 oxygen consumed) | Synthesis gas production (Nm3 syngas produced/Nm3 natural gas consumed) |
|---|---|---|
| 4A | 5.22 | 3.16 |
| 4D | 5.18 | 3.15 |
| 4E | 6.11 | 3.29 |
| 4F | 6.20 | 3.31 |
| 4G | 6.25 | 3.31 |

TABLE 8

| Case | $T_{inlet}$ (° C.) | $T_{exit}$ (° C.) | $Q_{c, in}$ (atm · a) | $Q_{c, out}$ (atm · a) | $K_{p, in}$ (atm · a) | $K_{p, out}$ (atm · a) | S/HHC | $S/C_{olefin}$ |
|---|---|---|---|---|---|---|---|---|
| 4A | 430 | 459 | 0.075 | 0.136 | 0.122 | 0.213 | 4.32 | 93 |
| 4D | 430 | 410 | 0.155 | 0.11 | 0.122 | 0.079 | 5.56 | Inf |
| 4E | 430 | 410 | 0.155 | 0.11 | 0.122 | 0.079 | 5.56 | Inf |

TABLE 8-continued

| Case | $T_{inlet}$ (° C.) | $T_{exit}$ (° C.) | $Q_{c, in}$ (atm · a) | $Q_{c, out}$ (atm · a) | $K_{p, in}$ (atm · a) | $K_{p, out}$ (atm · a) | S/HHC | S/C$_{olefin}$ |
|---|---|---|---|---|---|---|---|---|
| 4F | 430 | 410 | 0.155 | 0.11 | 0.122 | 0.079 | 5.56 | Inf |
| 4G | 430 | 410 | 0.155 | 0.11 | 0.122 | 0.079 | 5.56 | Inf |

Inf = infinite (no olefins present in natural gas)

Example 5

In this example two adiabatic reactors are placed in series and upstream a heat exchange reformer. The first reactor is an adiabatic prereformer with an inlet temperature of 430° C. One tenth (10%) of the total amount of tail gas (#1) is added downstream the adiabatic prereformer. The combined mixture is heated in an interstage heater to 485° C. and passed to the second adiabatic reformer. The effluent from the second adiabatic reformer is passed directly without further tail gas addition to the heat exchange reformer.

The remaining tail gas is added downstream the heat exchange reformer. The steam-to-carbon ratio (as defined in example 1) is 0.60. The heat exchange reformer exit temperature is 600° C. Other process parameters are as in Example 1. Key results are shown in Table 9.

Table 9 shows the results obtained with two adiabatic reformers in series and upstream a heat exchange reformer as described in Example 5. Inlet and exit refer to the second adiabatic reformer.

TABLE 9

| Heat Exchange Reformer Duty (kcal/Nm³ NG) | 265 |
|---|---|
| Interstage heater duty (Kcal/Nm³ NG) | 73 |
| S/HHC, inlet | 613 |
| S/C$_2$H$_4$, inlet | 1226 |
| $T_{exit}$ (° C.) | 469 |
| $Q_c$, inlet | 0.3544 |
| $Q_c$, outlet | 0.2722 |
| $K_p$, inlet | 0.3537 |
| $K_p$, outlet | 0.2633 |

It is seen from Table 9 that approximately 22% of the required duty is transferred in the interstage heater. This reduces the size of the heat exchange reformer. Hence, part of the required heat transfer surface may be designed without considering optimisation of the reaction system simultaneously. The adiabatic reformer can also be optimised without considering heat exchange surface. The content of ethane and ethylene in the feed gas to the adiabatic reformer is very low reducing substantially the risk of carbon formation on the catalyst as compared to having all the tail gas injected into the adiabatic prereformer. At the same time the contents of higher hydrocarbons in the feed gas to the ATR is reduced. This is an advantage in terms of margin to soot formation.

The $Q_c$ and $K_p$ values in Table 9 indicate that ideally the second adiabatic reformer can be operated without formation of graphite. It is known that nickel catalysts are more resistant to carbon formation from methane than thermodynamics predict using graphite. Hence, the adiabatic prereformer and the second adiabatic reactor may be operated with nickel catalysts, while the heat exchange reformer needs a more carbon resistant catalyst based on noble metals. In any case the amount of noble metal is reduced using the inventive process in this example. The accurate location of carbon limits depend on the specific catalyst.

Example 6

This example is based on Example 2E. An adiabatic prereformer is placed upstream and in series with a heat exchange reformer without interstage heating. All of tail gas #1 is added downstream the heat exchange reformer.

At these conditions after establishment of equilibrium of the steam reforming and shift reactions, there is no thermodynamic potential for the formation of graphite at temperatures up to 526° C. In one type of catalyst loading, nickel catalyst is loaded in positions where the temperature is below 526° C. and noble metal based catalysts in the warmer positions in the reactor. The actual temperature at which the change in catalyst is made for a given situation depends upon the pressure, natural gas composition, type of catalyst, reactor design etc.

Example 7

This example is based on Example 2E. An adiabatic prereformer is placed upstream and in series with a heat exchange reformer without interstage heating. All of tail gas #1 is added downstream the heat exchange reformer.

In this case the duty required in the heat exchange reformer is 659 kcal/Nm³ natural gas feed. In this example the total amount of feed to the plant is 100,000 Nm³/hr of natural gas. The other parameters are as in example 2E. The average heat flux to the heat exchange reformer is 75,000 kcal/m² inner tube surface/hr. The heat exchange reformer has a tubular geometry with a tube length of 10 meters.

Case 1: Inner tube diameter is 0.1 meter and catalyst particles with a diameter of 20 mm are used.

Case 2: Inner tube diameter is 0.05 meter and catalyst particles with a diameter of 10 mm are used.

Case 3: Inner tube diameter is 0.05 meter catalysed on the inner tube surface with a catalyst layer with a thickness of 0.05 mm.

Case 4: As case 3, but with a catalyst layer thickness of 0.1 mm.

Cases 5 and 6: As cases 3 and 4, but with an inner tube diameter of 0.02 meters.

Case 7: Inner tube diameter is 0.05 meter. The catalyst is a structured catalyst represented by a metallic cross-corrugated structure with a surface area of 900 m²/m³ reactor volume onto which a catalyst layer with a thickness of 0.05 mm has been placed.

Case 8: As case 7, but with an inner tube diameter of 0.02 meters.

Table 10 shows the catalyst and reactor volume data for various catalyst types in the heat exchange reformer of Example 7.

TABLE 10

| Case | Cat. Type | TD (m) | D$_p$ (mm) | SCSA m²/m³ | T (mm) | RV (m³) | CV (m³) | NOT | DP |
|---|---|---|---|---|---|---|---|---|---|
| 1 | Pel | 0.1 | 20 | — | — | 22 | 8.8[1] | 280 | High |
| 2 | Pel | 0.05 | 10 | — | — | 11 | 5.5[2] | 560 | v.hi |

TABLE 10-continued

| Case | Cat. Type | TD (m) | $D_p$ (mm) | SCSA $m^2/m^3$ | T (mm) | RV ($m^3$) | CV ($m^3$) | NOT | DP |
|---|---|---|---|---|---|---|---|---|---|
| 3 | CH | 0.05 | — | — | 0.05 | 11 | 0.022 | 560 | Low |
| 4 | CH | 0.05 | — | — | 0.10 | 11 | 0.044 | 560 | Low |
| 5 | CH | 0.02 | — | — | 0.05 | 4.4 | 0.028 | 1400 | Low/M |
| 6 | CH | 0.02 | — | — | 0.10 | 4.4 | 0.056 | 1400 | Low/M |
| 7 | STC | 0.05 | — | 900 | 0.05 | 11 | 0.495 | 560 | M |
| 8 | STC | 0.02 | — | 900 | 0.05 | 4.4 | 0.198 | 1400 | M |

1: Void is 60%.
2: Void is 50%.

Definitions:

| | |
|---|---|
| Pel: | Pellets; |
| TD: | Inner tube diameter; |
| $D_p$: | Characteristic catalyst pellet diameter; |
| SCSA: | Structured catalyst surface area per unit reactor volume; |
| t: | Catalyst layer thickness; |
| RV: | (Inner) Reactor volume; |
| CV: | Catalyst material Volume excl. void; |
| NOT: | Number of reformer tubes; |
| DP: | Pressure drop. |

From Table 10 it is seen that the use of either catalysed hardware attached to the inner surface of the tube or structured catalysts has advantage in terms of pressure drop and catalyst amount.

The invention claimed is:

1. Process for the production of synthesis gas from a hydrocarbon feed stock comprising the steps of endothermic and/or adiabatic catalytic steam reforming and autothermal steam reforming in series, wherein the steam reforming is carried out in one or more endothermic stages in series and/or in one or more adiabatic steam reforming stages in series with intermediate heating of feed stock gas leaving the adiabatic reforming stages and wherein carbon monoxide containing gas characterised by having a molar ratio of hydrogen to carbon of less than 4.5 is added prior to at least one of the endothermic or adiabatic steam reforming stages and/or prior to the autothermal steam reforming step.

2. Process of claim 1, comprising the further step of adiabatic pre-reforming the feed stock prior to the endothermic or adiabatic steam reforming.

3. Process of claim 1, wherein the endothermic or adiabatic steam reforming is performed in presence of catalysed hardware.

4. Process of claim 3, wherein the catalysed hardware is in form of a ceramic monolith or a cross-corrugated ceramic structure.

5. Process of claim 1, wherein the endothermic steam reforming step is performed in heat conducting relationship with a hot process gas.

6. Process of claim 5, wherein the hot process gas is an effluent stream from the autothermal reforming.

7. Process of claim 1, wherein the intermediate heating of the reacting feed stock is performed in heat conducting relationship with a hot process gas.

8. Process of claim 7, wherein the hot process gas is an effluent stream from the autothermal reforming.

9. Process according to claim 1, wherein the carbon monoxide containing gas comprises tail gas from a Fischer-Tropsch process.

* * * * *